United States Patent [19]
Sullivan et al.

[11] Patent Number: 5,355,422
[45] Date of Patent: Oct. 11, 1994

[54] BROADBAND OPTICAL MODULATOR

[75] Inventors: Charles T. Sullivan, Burnsville; Vladimir Solokov, Shakopee, both of Minn.

[73] Assignee: Honeywell Inc., Minneapolis, Minn.

[21] Appl. No.: 973,349

[22] Filed: Nov. 9, 1992

[51] Int. Cl.$^5$ ............................ G02B 6/10; G02F 2/00
[52] U.S. Cl. ............................................. 385/1; 385/2; 385/8; 385/14
[58] Field of Search ........................ 385/1, 2, 3, 8, 14; 359/333, 341, 181, 188, 285

[56] References Cited

U.S. PATENT DOCUMENTS

| | | | |
|---|---|---|---|
| 3,988,704 | 10/1976 | Rice et al. | 332/7.51 |
| 4,005,927 | 2/1977 | Caton | 385/8 |
| 4,084,182 | 4/1978 | Maiman | 359/285 X |
| 5,004,313 | 4/1991 | Ty Tan et al. | 385/2 |
| 5,046,155 | 9/1991 | Beyer et al. | 330/54 |
| 5,061,030 | 10/1991 | Miyamoto et al. | 385/14 X |
| 5,076,655 | 12/1991 | Bridges | 385/2 X |
| 5,157,744 | 10/1992 | Korotky | 385/3 X |
| 5,199,086 | 3/1993 | Johnson et al. | 385/2 |
| 5,237,629 | 8/1993 | Hietala et al. | 385/2 X |

OTHER PUBLICATIONS

"MESFET Distributed Amplifier Design Guidelines," by James B. Beyer et al., pp. 268–275, in IEEE Transactions on Microwave Theory and Techniques, vol. MTT-32, No. 3, Mar. 1984.

"Waveguide Electrooptic Devices for Optical Fiber Communication," by Steven K. Korotky et al., on pp. 421–465, in *Optical Fiber Telecommunications II*, edited by Stewart E. Miller et al., and pub. by Academic Press, Inc. (San Diego 1988 no month available).

Primary Examiner—John D. Lee
Assistant Examiner—Hemang Sanghavi
Attorney, Agent, or Firm—John G. Shudy, Jr.

[57] ABSTRACT

A broadband optical modulator having a light waveguide and modulating electrodes incorporated into an output or drain transmission line of a distributed amplifier driver. The modulator has a distributed gain mechanism which overcomes the electrical losses in the modulating electrodes and provides broadband velocity matching between the driving electrical signal and the modulated lightwave signal.

14 Claims, 3 Drawing Sheets

BROADBAND OPTICAL MODULATOR

BACKGROUND OF THE INVENTION

The present invention pertains to waveguide modulators, and particularly to optical waveguide modulators having an electrical drive mechanism. In related art optical waveguide modulators, two performance limitations are electrical signal losses along the modulator electrodes and phase velocity mismatches between the electrical drive signals and the modulated lightwave signals.

SUMMARY OF THE INVENTION

The invention is an optical waveguide modulator having electrodes incorporated in the output transmission line of a distributed electrical amplifier. Incorporated in the optical modulator is a distributed gain mechanism which achieves broadband phase velocity matching between the electrical drive signal and the modulated lightwave signal.

Also, there is amplification along the plurality of modulator electrodes to compensate for the attenuation of the electrical drive signal along the interaction length of the optical waveguide. The distributed amplifier driver has a greater gain-bandwidth product than a discrete amplifier driver. The distributed drive is capable of multi-octave bandwidths for lightwave communications. The distributed amplifier can provide a flat low-pass response nearly up to the cutoff frequency of the transmission lines. In contrast to discrete amplifiers, the single transistor performance required to drive an unsegmented waveguide modulator is relaxed in the present invention through the use of multiple-coupled transistors driving a segmented transmission line comprising the modulator electrodes. The present invention may be implemented in monolithic microwave integrated circuit (MMIC) technology.

DESCRIPTION OF THE PREFERRED EMBODIMENT

Figure 1:
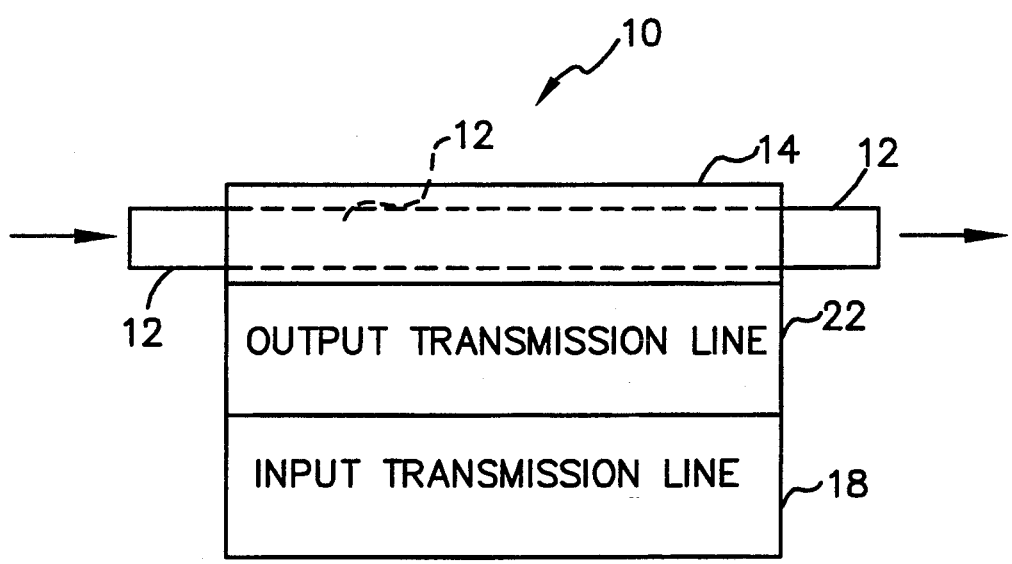
FIG. 1 is a block diagram of the broadband optical modulator of the present invention.

Broadband optical modulator 10 has a light waveguide 12 having modulator 14 for modulating light traveling down waveguide 12 as shown in FIG. 1. The total number of electrodes 14 in modulator 14 of FIG. 2 depends on the application and requirements of modulator 10. Each of the modulator electrodes 14 has one element connected to ground and the other element connected to a distributed amplifier driver 16. Driver 16 consists of a gate artificial transmission line 18, a plurality of discrete field effect transistors 20 and a drain artificial transmission line 22. Transistors 20 may be heterojunction bipolar transistors or any other device having equivalent functionality. Input or gate transmission line 18 consists of lumped inductors 24 and the input capacitances including gate-to-source capacitances of transistors 20. Output or drain transmission line 22 consists of lumped inductors 26 and the output capacitances including drain-to-source capacitances of transistors 20, and capacitances $C_m$ of waveguide modulator 14 electrode segments. Transmission lines 18 and 22 are essentially loaded constant-k lines, wherein the parasitic resistances of the transistors are considered the dominant loss factors. Lines 18 and 22 are terminated in their characteristic impedances at both ends whether the impedance be of a termination device or the impedance of an input or output device. Input or gate transmission line 18 and output or drain transmission line 22 are coupled through the transistors 20.

Figure 2:
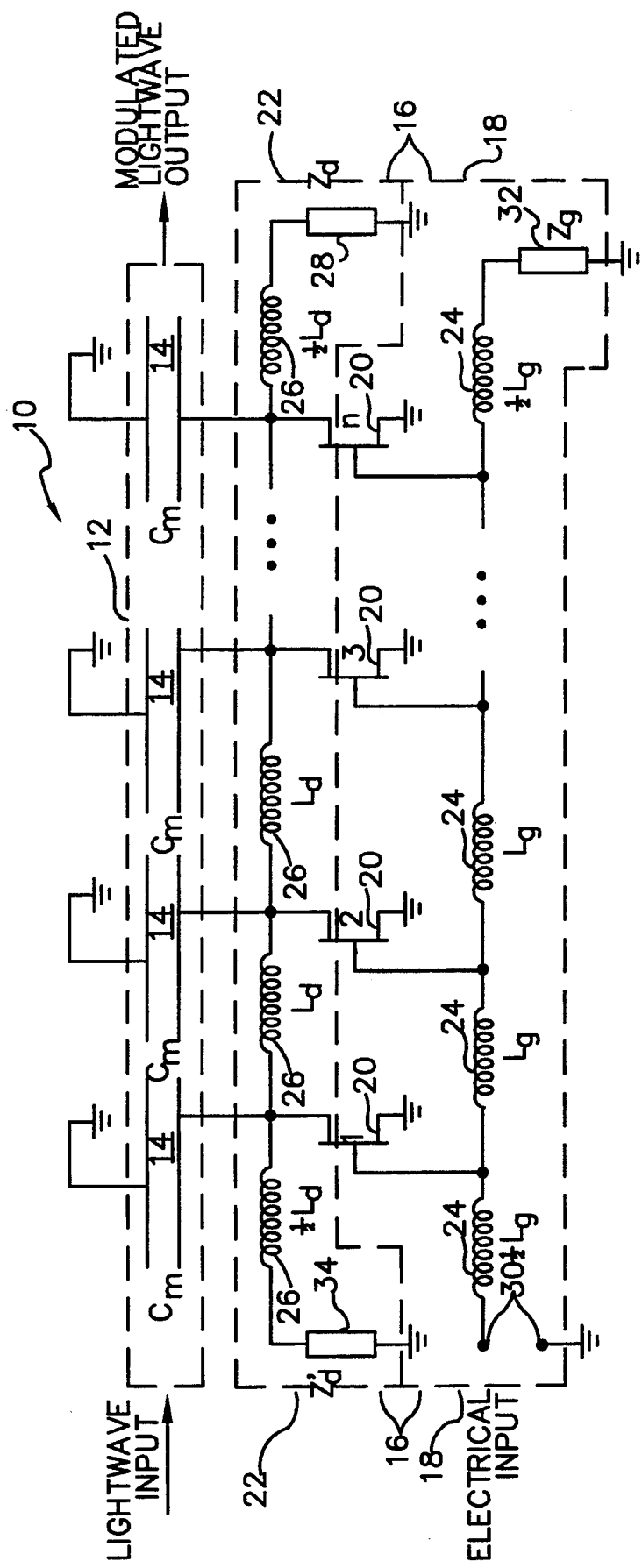
FIG. 2 is an electrical schematic of the broadband optical modulator.

There may be an N number of transistors and corresponding inductances of transmission lines 18 and 22 for distributed amplifier driver 16. FIG. 2 shows that N may be from three to a number greater than three. However, there is a certain amount of attenuation $A_d$ per section of drain transmission line 22 and an attenuation $A_g$ per section of gate transmission line 18. In the presence of attenuation $A_g$, the gain of distributed amplifier 16 cannot be increased indefinitely by adding devices 20 including corresponding inductances 24 and 26 of transmission lines 18 and 22, respectively. As a signal travels down gate line 18, each transistor 20 receives less energy than the previous one due to attenuation $A_g$ on gate line 18. Likewise, the signal excited in drain line 22 by transistor 20 is attenuated by subsequent line sections between it and output impedance 28. The gain of amplifier driver 16 increases with additional devices until an optimum number of devices 20 at a given frequency is attained. Any device 20 added beyond the optimum number is not driven sufficiently to excite a signal in drain line 22 which will overcome the attenuation $A_d$ in the extra section of line 22. Thus, the gain of amplifier 16 begins to decrease with a further addition of devices 20, including corresponding inductors 24 and 26. The number of devices 20 which maximizes gain at a given frequency is $N_{optimum} = \ln(A_d/A_g) \div (A_d - A_g)$.

The electrical signal at input 30 of gate line 18 propagates along transmission line 18 to gate termination impedance 32 where the signal is absorbed. As the electrical signal travels along gate line 18, the electrical signal drives transistors 20 which excite a signal along drain line 22 via transistors 20. If gate line 18 and drain line 22 phase velocities for a given signal are equal, the signal on drain line 22 is driven with proper phase by discrete transistors 20 to reinforce and amplify the amplitude of the traveling wave drain signal as it proceeds along the length of drain line 22. The forward-propagating drain signal is partially absorbed in the forward drain termination impedance 28 and partially by the losses associated with the plurality of modulator electrodes. Any backward-propagating drain signal is absorbed in the backward drain termination impedance 34. The backward-propagating drain signal is small because it is not driven synchronously. However, the forward-propagating drain signal is significant. The forward-propagating drain signal at the drain of each transistor 20 drives a respective pair of modulator electrodes 14 of light waveguide 12. Amplifier driver 16 is designed so that the electrical phase velocity on drain transmission line 22 matches the optical phase velocity of the traveling wave of the modulated light in modulator 14 of optical waveguide 12.

The phase velocity in the drain line is given by $V_{ph} = 1/\sqrt{L_d \cdot C_d}$ (sections/sec), where $L_d$ is the value of the lumped (or semi-lumped) inductors used in the drain transmission line, and $C_d = C_m + C_{out} + C_p$. $C_m$ is the shunt capacitance contributed by each modulator electrode, $C_{out}$ is the shunt capacitance of the FET, and $C_p$ is any additional parasitic capacitance.

The cutoff frequency of the output line is given by $1/\pi\sqrt{(L_d \cdot C_d)}$. On the other hand, the optical phase velocity is given by $((v_{ph})_{opt}) = (c/n_{eff})$ where $n_{eff}$ is the effective index of refraction of the light waveguide 12 and c is the speed of light in free space. For efficient optical/electrical interaction and effective phase modulation, the electrical and optical phase velocities must be matched, i.e., $(c/n_{eff}) = \sqrt{1/(L_d \cdot C_d)} = \sqrt{1/(L_g \cdot C_g)}$ where $L_g$ and $C_g$ are the corresponding gate transmission line parameters.

Note that the characteristic impedances of the gate and drain transmission lines are given by $R_{og} = \sqrt{(L_g/C_g)}$ and $R_{od} = \sqrt{(L_d/C_d)}$.

Generally, for semiconductor optical waveguides the optical phase velocity is less than the electrical velocity. For example, GaAs/AlGaAs waveguides propagate light about 3.4 times slower than the velocity of light in free space, while a electrical coplanar (microstrip) waveguide (CPW) typically used in such a modulator propagates the electrical signals about 2.6 times slower than the speed of light in free space. Consequently, $(v_{ph})_{opt} < (v_{ph})_{CPW}$.

Therefore, for proper design it is necessary to slow the electrical signal by about a factor of 1.3. This can be done since the modulator electrodes can be modified to provide the proper "slowing" shunt capacitance, or equivalently, the series inductances can be increased, or both. Note that simultaneously both the characteristic impedance and the cutoff frequencies are affected. Consequently, proper design of the modulator must provide the condition for matched phase velocities as well as design for the proper characteristic impedance (generally 50 ohms) of the lines. Thus, the modulation signal of the light is additively increased as it travels down waveguide 12 within modulator 14. These are features of device 10. Similarly, the phase velocities of gate line 18 and drain line 22 match.

Waveguide 12 and modulators 14 may be monolithically integrated with distributed amplifier 16. However, hybrid integration may be achieved for devices 12 and 16 provided that output transmission line 22 of distributed amplifier driver 16 has a plurality of connections to optical modulator elements 14. The modulator may be made of lithium niobate, or any other material in which the amplitude or phase of an optical wave propagating in the material may be affected by an impressed electrical signal, but the preferred embodiment is in gallium arsenide (GaAs). Transistors cannot be on lithium niobate but need to be on a semiconductor chip.

Preferred substrate material for distributed amplifier driver 16 and optical modulators 14 is gallium arsenide. The preferred materials for optical waveguide 12 are alloys of gallium arsenide and aluminum arsenide, but other ternary materials or quaternary materials may also be used, depending on the defect densities, the refractive indices, and the optical nonlinearities. The preferred composition, doping and thickness of the optical waveguide 12 layers depend on specific design requirements such as operating wavelength, mode size, and so forth, as is well known to those skilled in guided-wave optics.

Figure 3:
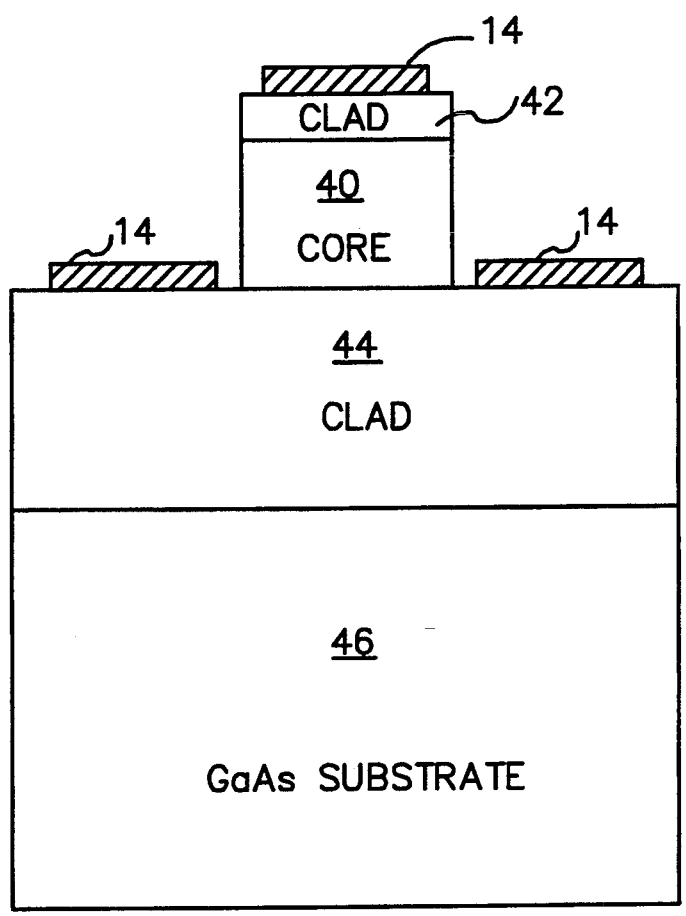
FIG. 3 shows the optical waveguide and phase modulator design.

FIG. 3 reveals the epilayer design of the preferred embodiment of an increment of light waveguide 12 and phase modulator 14 (which is regarded as plates 14) for a modulated light wavelength of about 1.3 microns. FIG. 3 is an end view. The choice of phase modulator as the modulator design function is exemplary only; other modulator designs can be used although phase modulation is the simplest and most general. (See for example, "Waveguide Electrooptic Devices for Optical Fiber Communications," S. K. Korotky and R. C. Alferness, Chapter 11 in *Optical Fiber Telecommunications II*, S. E. Miller and I. P. Kaminow (eds.), pp. 421–465, Academic Press; San Diego (1988).) Electrode plates 14 are composed of titanium (Ti) and gold (Au) and have a thickness greater than or equal to about 2 microns. The Ti layer is only a few nanometers thick and is used to improve the adhesion of Au to the epilayers. Electrical connections from distributed amplifier 16 are made directly to the signal and ground electrodes 14 or plates 14. Core 40 for a given increment has a width of about 4.2 microns and a thickness of about 2.0 microns. Core 40 is composed of undoped gallium arsenide (GaAs). On core 40 is an upper clad 42 which is composed of undoped aluminum gallium arsenide ($Al_{0.04}Ga_{0.96}As$). Upper clad 42 is about 4.2 microns wide and about 1.0 micron thick. Centered on each upper clad 42 is a signal plate or electrode 14 having a width of about 4 microns. Core 40 is on lower clad 44 which runs the length of waveguide 12. Lower clad 44 is about 4.0 microns thick to provide optical isolation from substrate 46. Undoped aluminum gallium arsenide ($Al_{0.04}Ga_{0.96}As$) is the composition of lower clad 44. On the same surface of lower clad 44 on which core 40 is situated, are a ground electrode 14 situated near (about 1.0 micron) one end of core 40 and another ground electrode 14 situated near (about 1.0 micron) the other end of core 40. Electrodes or plates 14 on lower clad 44 are about 10 to 100 microns wide. Lower clad 44 is situated on a semi-insulating gallium arsenide (GaAs) substrate 46. Substrate 46 runs the length of waveguide 12 and has a thickness greater than or equal to about 100 microns.

The preferred physical mechanism for optical modulation is the linear electro-optic effect, although other electrorefractive or electroabsorptive effects in the related art may be utilized.

The output of modulator 14 is intensity or phase modulated light, depending on the modulator design. Waveguide 12 may be one branch of a Mach-Zehnder interferometer, wherein the refractive index of this branch is electrically controlled. Waveguide 12 may also comprise the interaction region of a mode interference modulator (MIM). Modulator electrodes 14 establish an electric field within the optical waveguide thus changing the refractive index of light waveguide 12 at that area according to the electrorefractive behavior of the modulator material. Distributed amplifier driver 16 is broadband and provides for phase velocity adjustments. Plate electrodes 14 are part of the electronic circuit of distributed amplifier driver 16. Specifically, each of the plate 14 capacitances $C_m$ would be considered part of the drain-to-source capacitances of transistors 20 in output transmission line 22 in the design of distributed amplifier 16. Design of distributed amplifiers is well known in the field of related art. For instance, the essentials for designing field-effect transistor (FET) distributed amplifiers and determining parameter values for certain desired performance are in an article entitled "MESFET Distributed Amplifier Design Guidelines," by James B. Beyer et al., on pages 268–275, in *IEEE Transactions on Microwave Theory and Techniques*, volume MTT-32, number 3, March 1984.

Other embodiments and configurations not disclosed here may implement the invention.

We claim:
1. A broadband optical modulator comprising:
guiding means for guiding light;
modulator means, for modulating light; and
distributed amplifier driving means, connected to said modulator means, for driving said modulator means; and
wherein:
   said guiding means is an optical waveguide;
   said modulator means is a plurality of electrodes connected to said optical waveguide and connected to said distributed amplifier driving means;
   said distributed amplifier driving means has a plurality of output terminals wherein each of the plurality of output terminals is connected to one electrode of the plurality of electrodes; and
   said distributed amplifier is designed such that a first phase velocity of electrical signals at the output terminals of said distributed amplifier driving means matches a second phase velocity of a traveling wave of a modulated light in said optical waveguide.

2. A broadband optical modulator comprising:
a light waveguide having an input and an output;
a plurality of pairs of modulator electrodes situated in said light waveguide, wherein each pair of modulator electrodes is aligned along the light waveguide such that light propagating through said waveguide goes between each pair of modulator electrodes;
a first electrical transmission line connected to said plurality of pairs of modulator electrodes; and
a second electrical transmission line, connected to said first electrical transmission line, having an electrical input; and
wherein:
   said first and second transmission lines are a distributed gain means for overcoming loss and for amplifying an electrical signal that propagates through said first and second transmission lines and goes to each pair of modulator electrodes; and
   the electrical signal modulates the light propagating through said light waveguide, resulting in a traveling wave of light having the same velocity as the electrical signals propagating through said first and second transmission lines.

3. A broadband optical modulator comprising:
$N-1$ pairs of modulator electrodes along a light waveguide such that light propagating through said waveguide propagates between and through each pair of electrodes, wherein each pair of electrodes comprises first and second modulator electrodes, respectively, wherein N is an integer which is at least three, each first electrode is connected to a reference terminal, and an effect of each pair of electrodes on light going through the light waveguide is an electro-optic effect;
a first termination impedance having a first terminal connected to the reference terminal, and having a second terminal;
a second termination impedance having a first terminal connected to the reference terminal and having a second terminal;
a first plurality of N inductors wherein each inductor has first and second terminals, wherein the first terminal of the first inductor is connected to the second terminal of the first termination impedance, the second terminal of the first inductor is connected to the first terminal of the second inductor and to the second electrode of the first pair of modulator electrodes, the second terminal of the second inductor is connected to the first terminal of the third inductor and to the second electrode of the second pair of modulator electrodes, and so on such that the first terminal of an nth inductor is connected to the second terminal of an $(n-1)$th inductor, the second terminal of the nth inductor is connected to the second electrode of the nth pair of modulator electrodes and to the first terminal of the $(n+1)$th inductor wherein n is an integer from two to $(N-1)$, and the Nth inductor has the first terminal connected to the second terminal of the $(N-1)$th inductor and has the second terminal connected to the second terminal of said second termination impedance;
a third termination impedance having a first terminal connected to the reference terminal and having second terminal;
a second plurality of N inductors wherein each inductor has first and second terminals, the first terminal of the first inductor is an electrical signal input terminal, the second terminal of the first inductor is connected to the first terminal of the second inductor, the second terminal of the second inductor is connected to the first terminal of the third inductor, and so on such that the first terminal of an nth inductor is connected to the second terminal of an $(n-1)$th inductor and the second terminal of the nth inductor is connected to the first terminal of the $(n+1)$th inductor, wherein n is an integer from two to $(N-1)$, and the Nth inductor has the first terminal connected to the second terminal of the $(N-1)$th inductor and has the second terminal connected to the second terminal of said third termination impedance; and
a plurality of $N-1$ transistors wherein each transistor has first, second and third terminals, wherein the second terminals of said plurality of transistors are connected to the reference terminal, the first terminal of the first transistor is connected to the second electrode of the first pair of modulator electrodes, the third terminal of the first transistor is connected to the second terminal of the first inductor of said second plurality of inductors, the first terminal of the second transistor is connected to the second electrode of the second pair of modulator electrodes, the third terminal of the second transistor is connected to the second terminal of the second inductor of said second plurality of inductors, and so on such that the first terminal of the nth transistor is connected to the second electrode of the nth pair of modulator electrodes, and the third terminal of the nth transistor is connected to the second terminal of the nth inductor of said second plurality of inductors, wherein n is an integer between one and $(N-1)$.

4. The broadband optical modulator of claim 3 wherein:
said plurality of transistors are field effect transistors;
the first terminals of said plurality of transistors are drains;
the second terminals of said plurality of transistors are sources; and the third terminals of said plurality of transistors are gates.

5. The broadband optical modulator of claim 4 wherein: the number N of transistors is $$N = \ln(A_d/A_g)/(A_d - A_g);$$

$A_d$ is attenuation per section of a drain transmission line wherein the drain transmission line comprises inductance of said first plurality of inductors, capacitance of said N pairs of modulator electrodes and capacitance of said plurality of transistors, and the section of the drain transmission line comprises one inductor of said first plurality of inductors, one pair of electrodes of said N pairs of modulator electrodes, and one transistor of said plurality of transistors, and the inductor, the pair of electrodes and the transistor of the section of the drain transmission line are directly connected together; and $A_g$ is attenuation per section of a gate transmission line wherein the gate transmission line comprises inductance of said second plurality inductors and capacitance of said plurality of transistors, and the section of the gate transmission line comprises one inductor of said second plurality of inductors and one transistor of said plurality of transistors, and the inductor and the transistor of the section of the gate transmission line are connected together.

6. The broadband optical modulator of claim 5 wherein an electrical signal travelling through the gate transmission line will have an electrical velocity that is the same as the electrical velocity of an electrical signal travelling through the drain transmission line.

7. The broadband optical modulator of claim 6 wherein the electrical velocity of the signal through the gate and drain transmission lines is the same as a velocity of a travelling wave of modulated light propagating through said light waveguide.

8. The broadband optical modulator of claim 5 wherein said N pairs of modulator electrodes comprises:
   a substrate;
   a first clad situated on said substrate;
   a core situated on said first clad;
   a second clad situated on said core;
   a plurality of first plates situated on said second clad;
   a plurality second plates situated on said first clad; and
   wherein each first plate of said plurality of first plates is a first electrode and each second plate of said plurality of second plates is a second electrode.

9. The broadband optical modulator of claim 8 wherein:
   said substrate is a semi-insulating gallium arsenide substrate;
   said first clad is an undoped aluminum gallium arsenide clad;
   said core is an undoped gallium arsenide core;
   said second clad is an undoped aluminum gallium arsenide clad; and
   each of the first and second plates is a titanium and gold plate.

10. The broadband optical modulator of claim 9 wherein:
    said substrate has a length of the light waveguide and has a thickness of greater than or equal to about 100 microns;
    said first clad has a length of said substrate and a thickness of less than 20 microns;
    said core has a width of less than 20 microns and a thickness of less than 10 microns;
    said second clad has a width of less than 20 microns and a thickness of less than 5 microns;
    each first plate has a width of less than 20 microns and a thickness of less than 20 microns; and
    each second plate has a width less than 1000 microns and a thickness of less than 20 microns.

11. A broadband optical modulator system comprising:
    a distributive amplifier comprising:
        a first termination impedance having a first terminal connected to a reference terminal and having a second terminal;
        a first inductor having a first terminal connected to the second terminal of the first termination impedance and having a second terminal;
        a second inductor having a first terminal connected to an electrical input terminal and having a second terminal;
        a first transistor having a first terminal connected to the second terminal of the second inductor, having a second terminal connected to the second terminal of the first inductor, and having a third terminal connected to the reference terminal;
        a third inductor having a first terminal connected to the second terminal of the first inductor and having a second terminal;
        a fourth inductor having a first terminal connected to the second terminal of the second inductor and having a second terminal;
        a second transistor having a first terminal connected to the second terminal of the fourth inductor, having a second terminal connected to the second terminal of the third inductor and having a third terminal connected to the reference terminal;
        a fifth inductor having a first terminal connected to the second terminal of the third inductor and having a second terminal;
        a sixth inductor having a first terminal connected to the second terminal of the fourth inductor and having a second terminal;
        a third transistor having a first terminal connected to the second terminal of the sixth inductor, having a second terminal connected to the second terminal of the fifth inductor, and having a third terminal connected to the reference terminal;
        a seventh inductor having a first terminal connected to the second terminal of the fifth inductor and having a second terminal;
        an eighth inductor having a first terminal connected to the second terminal of the sixth inductor and having a second terminal;
        a fourth transistor having a first terminal connected to the second terminal of the eighth inductor, having a second terminal connected to the second terminal of the seventh inductor and having a third terminal connected to the reference terminal;
        a ninth inductor having a first terminal connected to the second terminal of the seventh inductor and having a second terminal;

a tenth inductor having a first terminal connected to the second terminal of the eighth inductor and having a second terminal;

a fifth transistor having a first terminal connected to the second terminal of the tenth inductor, having a second terminal connected to the second terminal of the ninth inductor and having a third terminal connected to the reference terminal;

an eleventh inductor having a first terminal connected to the second terminal of the ninth inductor and having a second terminal;

a twelfth inductor having a first terminal connected to the second terminal of the tenth inductor and having a second terminal;

a second termination impedance having a first terminal connected to the reference terminal and having a second terminal connected to the second terminal of the eleventh inductor; and a third termination impedance having a first terminal connected to the reference terminal and a second terminal connected to the second terminal of the twelfth inductor; and an optical modulator comprising:

a light waveguide; and first, second, third, fourth and fifth pairs of light modulator electrodes, each pair having first and second electrodes situated in said light waveguide, wherein:

the first electrodes of the first, second, third, fourth and fifth pairs, are connected to the reference terminal;

the second electrode of the first pair is connected to the second terminal of the first transistor;

the second electrode of the second pair is connected to the second terminal of the second transistor;

the second electrode of the third pair is connected to the second terminal of the third transistor;

the second electrode of the fourth pair is connected to the second terminal of the fourth transistor; and the second electrode of the fifth pair is connected to the second terminal of the fifth transistor.

12. The modulator of claim 11 wherein modulation of light through the optical modulator is caused by an electro-optic effect.

13. The modulator of claim 12 wherein:
the transistors are bipolar transistors;
the first terminal of each transistor is a base terminal;
the second terminal of each transistor is a collector terminal; and
the third terminal of each transistor is an emitter terminal.

14. The modulator of claim 12 wherein:
the transistors are field effect transistors;
the first terminal of each transistor is a gate terminal;
the second terminal of each transistor is a drain terminal; and
the third terminal of each transistor is a source terminal.

* * * * *